United States Patent
Su et al.

(10) Patent No.: US 10,880,931 B2
(45) Date of Patent: Dec. 29, 2020

(54) USER PAIRING METHOD, WIRELESS STATION AND WIRELESS SYSTEM

(71) Applicant: Realtek Semiconductor Corp., HsinChu (TW)

(72) Inventors: Hsuan-Jung Su, Taipei (TW); Yao-Yuan Chang, Tainan (TW); Der-Zheng Liu, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/519,022

(22) Filed: Jul. 23, 2019

(65) Prior Publication Data

US 2020/0120722 A1 Apr. 16, 2020

Related U.S. Application Data (60) Provisional application No. 62/744,664, filed on Oct. 12, 2018.

(51) Int. Cl.
*H04W 76/10* (2018.01)
*H04L 5/14* (2006.01)
(Continued)

(52) U.S. Cl.
CPC .............. *H04W 76/10* (2018.02); *H04L 5/14* (2013.01); *H04L 5/143* (2013.01); *H04L 5/1438* (2013.01); *H04L 67/38* (2013.01); *H04W 72/082* (2013.01)

(58) Field of Classification Search
CPC ......... H04L 5/1438; H04L 5/14; H04L 5/143; H04L 29/06; H04L 67/38; H04W 76/10;
(Continued)

(56) References Cited

U.S. PATENT DOCUMENTS 8,547,884 B2 * 10/2013 Lo ..................... H04W 72/0406
370/295
9,363,066 B2 * 6/2016 Lo ............................ H04L 5/14
(Continued)

OTHER PUBLICATIONS

Deli Liu et al., The Sub-channel Allocation Algorithm in Femtocell Networks Based on Ant Colony Optimization, 2013 IEEE, MILCOM 2012—2012 IEEE Military Communications Conference, 2012.
(Continued)

*Primary Examiner* — Man U Phan
(74) *Attorney, Agent, or Firm* — Winston Hsu (57) ABSTRACT

A user pairing method is provided. The method includes the following steps: selecting a first uplink user device among the uplink set; selecting a first downlink user device among the downlink set; determining whether the first uplink channel gain corresponding to the first uplink user device is greater than a second uplink channel gain corresponding to the first downlink user device, to generate a first determination result; determining whether a first signal to noise plus interference ratio (SINR) perceived at the first downlink user device is greater than a first SINR threshold, to generate a second determination result; forming the first uplink user device and the first downlink user device as a first user pair in a full duplexing (FD) mode when the first determination result and the second first determination result are positive.

20 Claims, 3 Drawing Sheets

(51) Int. Cl.
*H04W 72/08* (2009.01)
*H04L 29/06* (2006.01)

(58) Field of Classification Search
CPC ........... H04W 72/085; H04W 72/0446; H04W 72/082; H04W 72/08
USPC .................................................. 370/277, 329
See application file for complete search history.

(56) References Cited

U.S. PATENT DOCUMENTS

| | | | |
|---|---|---|---|
| 9,420,606 B2* | 8/2016 | Bhushan | H04L 5/14 |
| 9,698,963 B2* | 7/2017 | Luo | H04L 5/14 |
| 9,839,037 B2* | 12/2017 | Lo | H04L 45/02 |
| 10,212,723 B2* | 2/2019 | Jiang | H04L 5/0005 |
| 10,298,297 B2* | 5/2019 | Cui | H04B 7/0689 |
| 10,368,357 B2* | 7/2019 | Lopez-Perez | H04W 72/042 |
| 10,567,147 B2* | 2/2020 | DiFazio | H04L 5/14 |
| 2018/0213547 A1* | 7/2018 | Ju | H04W 72/1242 |
| 2019/0123855 A1* | 4/2019 | Stirling-Gallacher | H04L 5/143 |
| 2020/0119900 A1* | 4/2020 | Lai | H04L 5/1438 |

OTHER PUBLICATIONS

Kwang Mong Sim et al., Ant Colony Optimization for Routing and Load-Balancing: Survey and New Directions, IEEE 2003, IEEE Transactions on Systems, Man, and Cybernetics—Part A: Systems and Humans, vol. 33, No. 5, Sep. 2003, pp. 560-572.

* cited by examiner

USER PAIRING METHOD, WIRELESS STATION AND WIRELESS SYSTEM

CROSS REFERENCE TO RELATED APPLICATIONS

This application claims the benefit of U.S. provisional application No. 62/744,664, filed on Oct. 12, 2018, which is incorporated herein by reference.

BACKGROUND OF THE INVENTION

1. Field of the Invention

The present disclosure relates to a user pairing method, a wireless station and a wireless system, and more particularly, to a user pairing method, a wireless station and a wireless system capable of maximizing sum rate.

2. Description of the Prior Art

As the demand of wireless service increases, the utilized frequency spectrum is getting crowded, which might degrade the quality of service (QoS) of wireless system. Enhancing data rate is always a goal for the next generation mobile communication. Full-duplexing (FD) communications, allowing simultaneous transmission and reception on the same frequency carrier(s), attract more attentions recently, which is expected to be a promising way to increase spectrum efficiency.

Previously, strong self-interference makes FD communications difficult to be realized. Thanks to the breakthroughs in hardware development, self interference is able to be reduced by 110 dB, which makes FD communications possible to be realized and able to upgrade the capacity to a new level. In FD systems, user pairing is necessary.

SUMMARY OF THE INVENTION

It is a primary objective of the present disclosure to provide a user pairing method, a wireless station and a wireless system capable of maximizing sum rate.

An embodiment of the present disclosure provides a user pairing method, applied in a wireless station. The method comprises the steps of (a) obtaining an uplink set and a downlink set; (b) selecting a first uplink user device among the uplink set, wherein a first uplink channel gain corresponding to the first uplink user device is the strongest uplink channel gain among uplink channel gains corresponding to uplink user devices within the uplink set; (c) selecting a first downlink user device among the downlink set, wherein a first downlink channel gain corresponding to the first downlink user device is the strongest downlink channel gain among downlink channel gains corresponding to downlink user devices within the downlink set; (d) determining whether the first uplink channel gain corresponding to the first uplink user device is greater than a second uplink channel gain corresponding to the first downlink user device, to generate a first determination result; (e) determining whether a first signal to noise plus interference ratio (SINR) perceived at the first downlink user device is greater than a first SINR threshold, to generate a second determination result; (f) forming the first uplink user device and the first downlink user device as a first user pair in a full duplexing (FD) mode when the first determination result and the second determination result are positive, wherein the first user pair in the FD mode represents that an uplink transmission by the first uplink user device and a downlink transmission by the first downlink user device are performed within a time period and a frequency spectrum.

An embodiment of the present disclosure further provides a wireless station, configured to execute the user pairing method stated above.

An embodiment of the present disclosure further provides a wireless system. The wireless system includes multiple uplink user devices, multiple downlink user devices and the wireless station stated above.

DETAILED DESCRIPTION

Figure 1:
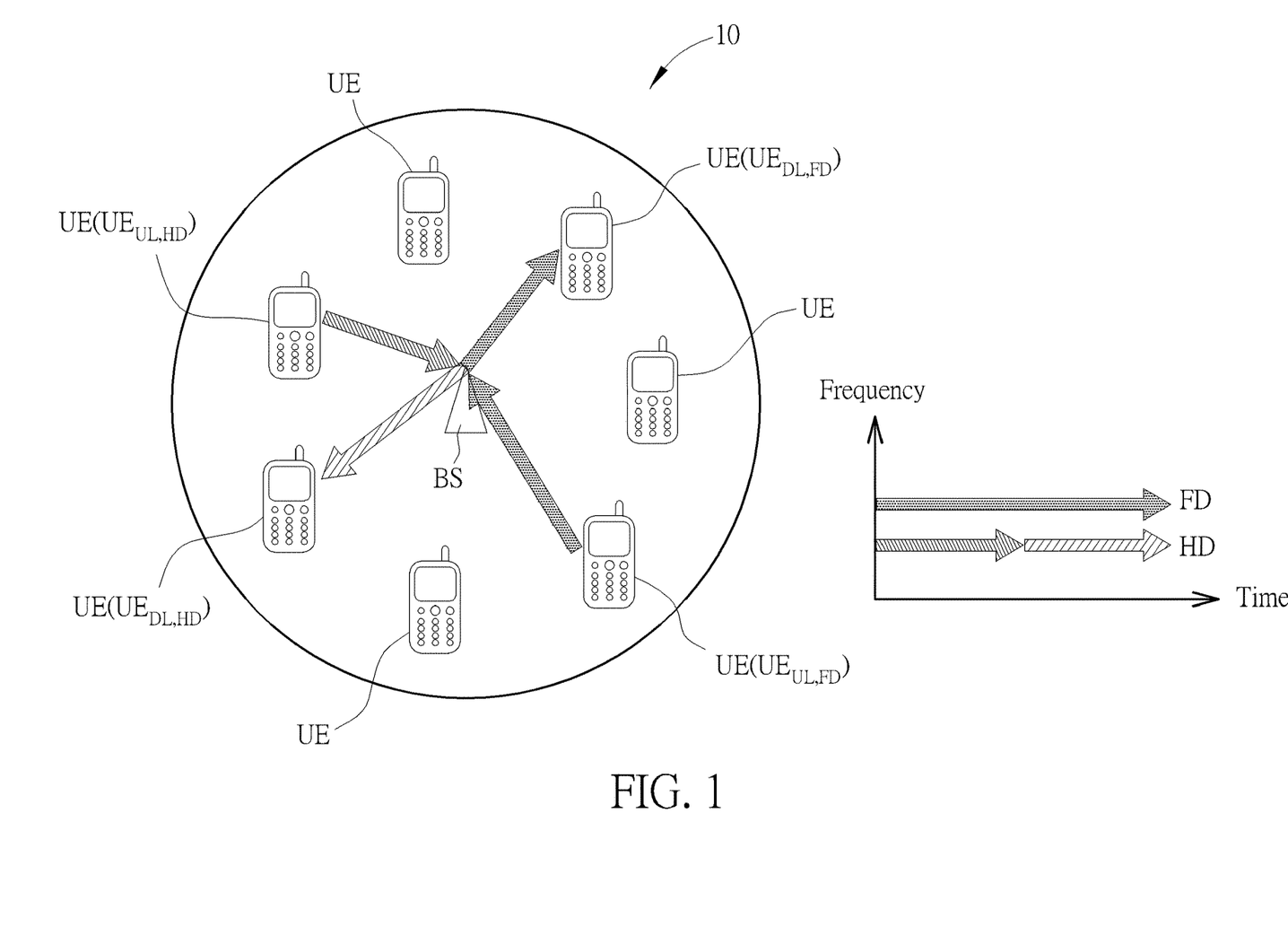
FIG. 1 is a schematic diagram of a wireless system according to an embodiment of the present disclosure.

FIG. 1 is a schematic diagram of a wireless system 10 according to an embodiment of the present disclosure. The wireless system 10 may be a centralized-control system, e.g., a cellular system, or even be a distributed-control system, e.g., a system forming an ad hoc network. The wireless system 10 comprises a wireless station BS and a plurality of user devices UE. The wireless station BS may be regarded as a base station, in any scale, e.g., a macro base station or a femtocell base station. The user device UE may be a user's equipment, in LTE terminology, which can be a cell phone which FIG. 1 illustrated, or otherwise be a tablet computer, a laptop or the like. Some of the user devices UE are uplink (UL) user devices while some are downlink (DL) user devices.

The wireless system 10 or the wireless station BS may operate in a full duplexing (FD) mode with some of the user devices UE, and operate in a half duplexing (HD) mode with some of the user devices UE. For exemplary purpose, some user devices UE in FIG. 1 are further annotated as $UE_{UL,FD}$, $UE_{DL,FD}$, $UE_{UL,HD}$, $UE_{DL,HD}$. In this case, the wireless station BS may operate in the FD mode with the user devices $UE_{UL,FD}$, $UE_{DL,FD}$, and operate in the HD mode with the user devices $UE_{UL,HD}$, $UE_{DL,HD}$.

In the FD mode, the wireless station BS receives data from the uplink user device $UE_{UL,FD}$, and transmits data to the downlink user device $UE_{DL,FD}$, at the same period of time and at the same frequency spectrum (e.g., one or more OFDM subcarrier(s)), as the right-bottom corner of FIG. 1 illustrates. In the HD mode, the wireless station BS receives data from the uplink user device $UE_{UL,HD}$ and transmits data to the downlink user device $UE_{DL,HD}$ at the same frequency spectrum but in different time periods, as the right-bottom corner of FIG. 1 illustrates. It is assumed that configuration in FIG. 1 is under time division duplexing (TDD) scheme, but the invention is not limited thereto. In an embodiment, frequency division duplexing (FDD) or other division duplexing scheme can be utilized by the wireless station BS, which is also within the scope of the present disclosure.

The user devices $UE_{UL,FD}$, $UE_{DL,FD}$ are formed as an user pair. The wireless station BS is configured to form the user pair(s) (i.e., perform a user pairing operation) among the plurality of user devices UE, and operates in the FD mode with the user pair(s), or with the paired uplink user device(s)

and the paired downlink user device(s) in the FD mode. The wireless station BS may operate in the HD mode with the rest of the user device(s).

Furthermore, the wireless station BS may perform the user pairing operation according to the channel gains between the user devices UE and the wireless station BS. The channel gain is actually the channel attenuation, the attenuation of a specific channel between the wireless station BS and a specific user device UE. If the wireless system 10 is latency tolerable, the channel gain can be obtained from indicators such as RSSI, RSRP, RSRQ and/or the like, fed back from the user devices UE. If the wireless system 10 is an ultra-low latency system, in which handshaking protocols exchanging channel information are not allowed, the channel gains between the user devices UE and the wireless station BS can be approximated by the distances between the user devices UE and the wireless station BS, given that the distance information (between the UEs and the BS) is available at the wireless station BS. In an embodiment, the distance information (between UEs and BS) may be obtained via some positioning technologies, which is not narrated herein.

Figure 2:
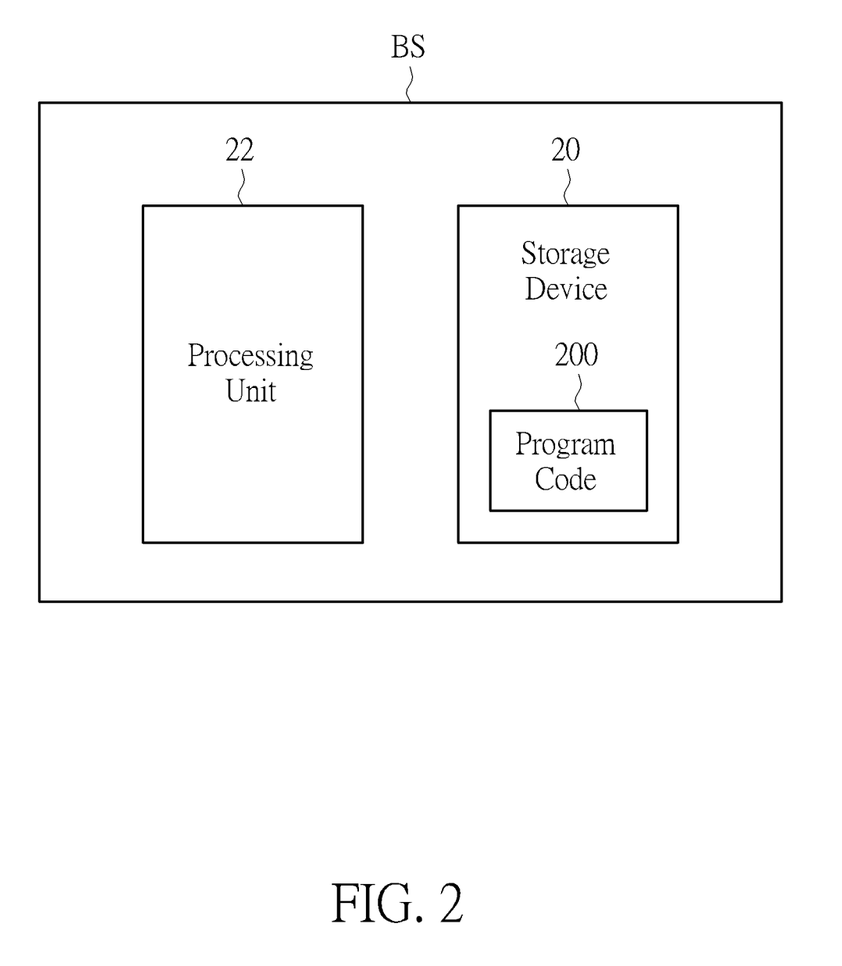
FIG. 2 is a schematic diagram of a wireless station according to an embodiment of the present disclosure.

FIG. 2 is a schematic diagram of the wireless station BS according to an embodiment of the present disclosure. In addition to antennas, the wireless station BS comprises a storage device 20 and a processing unit 22. The storage device 20 is configured to store a program code 200, and the program code 200 is configured to instruct the processing unit 22 to perform a user pairing operation. The storage device 20 may be, for example, a random access memory (RAM), a read-only memory (ROM), a volatile memory, or a non-volatile memory (NVM), e.g., an electrically erasable programmable read only memory (EEPROM) or a flash memory, which is not limited thereto. The processing unit 22 may be, for example, an application specific integrated circuit (ASIC), a central processing unit (CPU), a digital signal processor (DSP), or a tensor processing unit (TPU), which is not limited thereto.

The processing unit 22 may perform the user pairing operation to maximize an overall sum rate of the wireless system 10, subject to some transmission power constraints and reliable constraints (e.g., an SINR (signal to noise plus interference ratio) constraint in general). In an embodiment, the user pairing operation can be regarded to solve an optimization problem as $$\max_{x_{i,j},y_{i,j},P_j^D,P_i^U} \sum_{i=1}^{K_{UL}} \sum_{j=1}^{K_{DL}} x_{i,j}(R_{i,j}^{F,U} + R_{i,j}^{F,D}) + \sum_{i=1}^{K_{UL}} \sum_{j=1}^{K_{DL}} y_{i,j}(R_i^{H,U} + R_j^{H,D}) \quad (1a)$$

$$\text{s.t.} \sum_{j=1}^{K_{DL}} x_{i,j} \le 1, \forall i \quad (1b)$$

$$\sum_{j=1}^{K_{DL}} y_{i,j} \le 1, \forall i \quad (1c)$$

$$\sum_{j=1}^{K_{DL}} x_{i,j} + y_{i,j} \le 1, \forall i \quad (1d)$$

$$\sum_{j=1}^{K_{DL}} P_j^D \le P_{BS} \quad (1e)$$

-continued $$P_i^U \le P_{UE} \forall i \quad (1f)$$

$$SINR_{i,j} \ge SINR_{th}, \forall i, j. \quad (1g)$$

In equations (1a)-(1g), i/j is an uplink/downlink user device index, $x_{i,j}/y_{i,j}$ is an indicator, being either 0 or 1, to indicate where the user devices $UE_{UL,i}$ and $UE_{DL,j}$ are paired in the FD/HD mode. In an embodiment, $K_{UL}=K_{DL}=K$. $R_{i,j}^{F,U}$, $R_{i,j}^{F,D}$, $R_i^{H,U}$, $R_j^{H,D}$ can be expressed as $$R_{i,j}^{F,U} = \log\left(1 + \frac{P_i^U H_{i \to B}^U}{\sigma_n^2 + P_j^D H_{B,B}}\right) \quad (2a)$$

$$R_{i,j}^{F,D} = \log\left(1 + \frac{P_j^D H_{B \to j}^D}{\sigma_n^2 + P_i^U H_{i \to j}}\right) \quad (2b)$$

$$R_i^{H,U} = \frac{1}{2}\log\left(1 + \frac{P_i^U H_{i \to B}^U}{\sigma_n^2}\right) \quad (2c)$$

$$R_j^{H,D} = \frac{1}{2}\log\left(1 + \frac{P_j^D H_{B \to j}^D}{\sigma_n^2}\right) \quad (2d)$$

In equations (2a)-(2d), $R_{i,j}^{F,U}$ represents an uplink rate contributed by the uplink user device $UE_{UL,i}$ in the FD mode given $UE_{DL,j}$ is the FD paired downlink user device, $R_{i,j}^{F,D}$ represents a downlink rate for the downlink user device $UE_{DL,j}$ in the FD mode given $UE_{UL,i}$ is the FD paired uplink user device, $R_i^{H,U}$ represents an uplink rate contributed by the uplink user device $UE_{UL,i}$ in the HD mode, and $R_j^{H,D}$ represents a downlink rate for the downlink user device $UE_{DL,j}$ in the HD mode. In some embodiments, the uplink rate and the downlink rate can be viewed as an average uplink rate and an average downlink rate respectively.

$P_i^U$ is an uplink transmission power of the uplink user device $UE_{UL,i}$, and $P_j^D$ is a downlink transmission power for the downlink user device $UE_{DL,j}$. $H_{i \to B}^U$ is an uplink channel gain from the uplink user device $UE_{UL,i}$ to the station BS, and $H_{B \to j}^D$ is a downlink channel gain from the station BS to the downlink user device $UE_{DL,j}$. $P_j^D H_{B,B}$ represents a residual self-interference, perceived at the wireless station BS. $H_{i \to j}$ represents a mutual channel gain from $UE_{UL,i}$ to $UE_{DL,j}$. $\sigma_n^2$ represents a noise power.

Equation (1a) represents the objective is to maximize the sum rate. Equation (1b) represents that only one downlink user device $UE_{DL,j}$ can be paired with one uplink user device $UE_{UL,i}$ in the FD mode. Equation (1c) represents that only one downlink user device $UE_{DL,j}$ can be paired with one uplink user device $UE_{UL,i}$ in the HD mode. Equation (1d) represents that the user pair ($UE_{UL,i}$, $UE_{DL,j}$) cannot operate in both the FD mode and the HD mode. Equations (1e) and (1f) are transmission power constraints for the station BS and the user device UE. Equation (1g) symbolically represents the reliable constraints to make sure that the data received can be successfully decodable, which may symbolically represent one or more SINR constraints, where $SINR_{i,j}$ may be one of, a part of, or all of the second terms within the logarithm function of eq. (2a)-(2d).

The user pairing operation may be based on three properties as discussed in the following.

First, given the user devices $UE_a$ and $UE_b$ are paired in the FD operation mode, choosing the user device with larger channel gain (choosing among $UE_a$ and $UE_b$) as the uplink user device would bring more performance in terms of transmission rate. By comparing a first sum rate of "$UE_a$ being the uplink user device and $UE_b$ being the downlink user device" with a second sum rate of "$UE_b$ being the uplink user device and $UE_a$ being the downlink user device", a situation can be expressed as equation (3a). Under a condition of $P_a^U = P_a^D = P_b^U = P_b^D$, it is found that equation (3a) would be equivalent to (3b). That is, if the inequality (3b) is true/sustained, then the inequality (3a) would be true/sustained.

$$R_{a,b}^{F,U} + R_{a,b}^{F,D} > R_{b,a}^{F,U} + R_{b,a}^{F,D} \tag{3a}$$

$$H_{a \to B}^U - H_{b \to B}^U > 0 \tag{3b}$$

Second, given that the user device $UE_{UL,i}$ is a candidate uplink user device in the FD mode, choosing the downlink user device with larger channel gain (choosing among all downlink user devices $UE_{DL,1}$–$UE_{DL,K'}$, where $K' = K_{DL}$) to pair with $UE_{UL,i}$ would bring more performance in terms of transmission rate. By comparing a third sum rate of a user pair ($UE_{UL,i}$, $UE_{DL,j}$) with a fourth sum rate of another user pair ($UE_{UL,i}$, $UE_{DL,k\neq j}$), a situation can be expressed as equation (4a). Under the condition of $P_a^u = P_a^D = P_b^U = P_b^D$, it is found that equation (4a) would be equivalent to equation (4b), and a condition expressed in equation (4c) is with high probability to make equation (4b) sustained. That is, if inequality (4c) is true/sustained, then the inequality (4a) would likely be true/sustained.

$$R_{i,j}^{F,U} + R_{i,j}^{F,D} > R_{i,j}^{F,U} + R_{i,j}^{F,D} \tag{4a}$$

$$\frac{H_{B \to j}^D}{H_{i \to j}} - \frac{H_{B \to k}^D}{H_{i \to k}} > 0 \tag{4b}$$

$$H_{B \to j}^D - H_{B \to k}^D > 0 \tag{4c}$$

Third, given that ($UE_{UL,i}$, $UE_{DL,j}$) has been paired, if the mutual channel gain $H_{i \to j}$ is too large, operating in the HD mode would bring more performance in terms of transmission rate. By comparing a fifth sum rate of the HD mode with a sixth sum rate of the FD mode, a situation can be expressed as equation (5a). Assuming $R_{i,j}^{F,D}$ is negligible when an SINR, denoted as $SINR_{i,j}$, is less than a threshold $\theta_{FD}$, as equation (5b) expresses. Equation (5b) is true/sustained when equation (5c) is true/sustained. When equation (5c) is true/sustained, meaning that the mutual channel gain $H_{i \to j}$ is too large, equation (5a) can be reformulated as equation (5d), and a necessary condition expressed as equation (5e) is found. Unless equation (5c) is false, the user pair ($UE_{UL,i}$, $UE_{DL,j}$) would operate in the HD mode.

$$R_i^{H,U} + R_j^{H,D} > R_{i,j}^{F,U} + R_{i,j}^{F,D} \tag{5a}$$

$$SINR_{i,j} = \frac{P_j^D H_{B \to j}^D}{\sigma_n^2 + P_i^U H_{i \to j}} < \theta_{FD} \tag{5b}$$

$$H_{i \to j} > \frac{P_j^D H_{B \to j}^D}{P_i^U \theta_{FD}} \tag{5c}$$

$$R_i^{H,U} + R_j^{H,D} > R_{i,j}^{F,U} \tag{5d}$$

$$H_{B \to j}^D \geq H_{i \to B}^U \tag{5e}$$

Based on the three properties in the above, the user pairing operation may be listed in Table I, and may be compiled as the program code 200.

TABLE I

| | |
|---|---|
| 1 | Initialization |
| 2 | Obtain an uplink index set US = {1, ..., $K_{uL}$} and UL channel gains $H_{i \to B}^U$, $\forall i \in$ US |
| 3 | Obtain a downlink index set DS = {1, ..., $K_{DL}$} and DL channel gains $H_{B \to j}^D$, $\forall j \in$ DS |
| 4 | Set $x_{i,j} = 0$, $\forall i \in$ US and $j \in$ DS |
| 5 | Set FUS = FDS = HUS = HDS = $\phi$ |
| 6 | repeat |
| 7 | Select an uplink user device $UE_{UL,i^*}$ such that $i^* = \underset{i \notin FUS, i \in US}{\arg\max}\ H_{i \to B}^U$ |
| 8 | repeat |
| 9 | Select an *downl*ink user device $UE_{DL,j^*}$ such that $j^* = \underset{j \notin FDS, j \in DS}{\arg\max}\ H_{B \to j}^D$ |
| 10 | if $\{H_{i^* \to B}^U > H_{j^* \to B}^U$ and $SINR_{j|i} \geq SINR_{th}\}$ |
| 11 | then |
| 12 | $x_{i^*,j^*} = 1$; |
| 13 | US $\Leftarrow$ US \ {i*}, FUS $\Leftarrow$ {i*} ; |
| 14 | DS $\Leftarrow$ DS \ {j*}, FDS $\Leftarrow$ {j*}; |
| 15 | elseif $\left\{H_{i^* \to B}^U \leq H_{j^* \to B}^U, H_{i^* \to j^*} \leq \frac{P_{j^*}^D H_{B \to j^*}^D}{P_{i^*}^U \theta_{FD}}, \text{and } SINR_{j|i} \geq SINR_{th}\right\}$ |
| 16 | $x_{i^*,j^*} = 1$; |
| 17 | US $\Leftarrow$ US \ {i*}, FUS $\Leftarrow$ {i*}; |
| 18 | DS $\Leftarrow$ DS \ {j*}, FDS $\Leftarrow$ {j}; |
| 19 | else |
| 20 | $x_{i^*,j^*} = 0$; DS $\Leftarrow$ DS \ {j*}; |
| 21 | end if |

TABLE I-continued

```
22    until x_{i*,j*} = 1 or no other DL user device UE_{DL, j} can be paired with UL user device UE_{DL, i*}
23        US ⇐ {1, ... , K_{UL}}\ FUS, DS ⇐ {1, . . . , K_{DL}} \ FDS
24    until Each uplink user device UE_{UL, i} is calculated
25    \ \ FUS and FDS are obtained
26    HUS ⇐ {1, . . . , K_{UL}} \ FUS, HDS ⇐ {1, . . . , K_{DL}} FDS
```

In Lines 2-3, the processing unit 22 may obtain the uplink index set US={1, . . . ,$K_{UL}$} and the downlink index set DS={1, . . . ,$K_{DL}$}. Equivalently, the processing unit 22 may obtain an uplink set ULS={$UE_{UL,i}|\forall i \in US$} and a downlink set DLS={$UE_{DL,j}|\forall j \in DS$}.

In Line 4, the processing unit 22 initializes the indicator $x_{i,j}$ to be 0, where $x_{i,j}=1$ means that the user devices $UE_{UL,i}$ and $UE_{DL,j}$ are paired in the FD mode; otherwise, $x_{i,j}=0$ represents that the user devices $UE_{UL,i}$ and $UE_{DL,j}$ are not successfully paired in the FD mode.

In Line 5, the processing unit 22 initializes the index sets FUS, FDS, HUS, HDS as an empty set ϕ, where FUS/FDS denotes an index set of uplink/downlink user devices, referring to the uplink/downlink user devices which the station BS can operate the FD mode with, and HUS/HDS denotes an index set of uplink/downlink user devices, referring to the uplink/downlink user devices which the station BS can operate the HD mode with.

Lines 6-24 may be regarded as a loop structure over, or with respect to, the uplink user device index i.

In Line 7, the processing unit 22 selects the uplink user device $UE_{UL,i*}$ such that $$i^* = \underset{i \notin FUS, i \in US}{\mathrm{argmax}}\ H_{i \rightarrow B}^{U}.$$

The uplink channel gain $H_{i* \rightarrow B}^{U}$ is stronger than all the other uplink channel gain $H_{i \rightarrow B|i \neq i*}^{U}$ corresponding to the uplink user device $UE_{UL,i \neq i*}$, which means that the uplink channel gain $H_{i* \rightarrow B}^{U}$ is the strongest among all the channel gains corresponding to the uplink user devices in the uplink set ULS. Line 7 is inspired by the first property or equation (3b).

Lines 8-22 may be regarded as a loop structure over, or with respect to, the downlink user device index j.

In Line 9, the processing unit 22 selects the downlink user device $UE_{DL,j*}$ such that $$j^* = \underset{j \notin FDS, j \in DS}{\mathrm{argmax}}\ H_{B \rightarrow j}^{D}.$$

The downlink channel gain $H_{B \rightarrow j*}^{D}$, is stronger than all the other downlink channel gain $H_{B \rightarrow j|j \neq j*}^{D}$, corresponding to the downlink user device $UE_{DL,j \neq j*}$, which means that the downlink channel gain $H_{B \rightarrow j*}^{D}$ is the strongest among all the channel gains corresponding to the downlink user devices in the downlink set DLS. Line 9 is inspired by the second property or equation (4c).

Until Line 9, the user device $UE_{UL,i*}$ and $UE_{DL,j*}$ are candidates, but not necessarily, to be paired. In Line 10, the processing unit 22 determines whether equation (3b) is true, and also determines whether $SINR_{j|i}$ is larger than a SINR threshold $SINR_{th}$, where the expression of $SINR_{j|i}$ may be referred to equation (5b), which represents the SINR value perceived at the downlink user device $UE_{DL,j*}$ given that $UE_{UL,i*}$ is the FD paired uplink user device. If both determination results are positive, the processing unit 22 pairs the user device $UE_{UL,i*}$ and $UE_{DL,j*}$ as a user pair ($UE_{UL,i*}$, $UE_{DL,j*}$) in the FD mode by setting $x_{i*,j*}=1$, as the execution in Line 12.

In Lines 13-14, 17-18, 20 and 23, "\" represents a set minus operation.

In Line 13, the processing unit 22 removes {i*} from the original uplink index set US, equivalently to removing $UE_{UL,i*}$ from the uplink set ULS, to update the uplink set ULS.

In Line 14, the processing unit 22 removes {j*} from the original downlink index set DS, equivalently to removing $UE_{DL,j*}$ from the downlink set DLS, to update the downlink set DLS.

When equation (3b) is false, the processing unit 22 further determines whether equation (5c) is false and whether $SINR_{j|i}$ is larger than the SINR threshold $SINR_{th}$, as the execution in Line 15. If equation (5c) is false, forming the user pair ($UE_{UL,i*}$, $UE_{DL,j*}$) in the FD mode remains considered. If the condition in Line 15 holds, the processing unit 22 pairs the user device $UE_{UL,i*}$ and $UE_{DL,j*}$ as the user pair ($UE_{UL,i*}$, $UE_{DL,j*}$) in the FD mode by setting $x_{i*,j*}=1$, as the execution in Lines 16-18.

When the user devices $UE_{UL,i*}$ and $UE_{DL,j*}$ fail to be pared in the FD mode, the processing unit 22 sets $x_{i*,j*}=0$ and removes $UE_{DL,j*}$ from the downlink set DLS, to update the downlink set DLS, as the execution in Line 20.

Once the indicators $x_{i,j}$ are determined for all i and j, in an embodiment, the processing unit 22 may further solve the problem shown in equation (1a)-(1g), which is to determine the transmission powers $P_i^U$ and $P_j^D$ for all i and j. In another embodiment, the processing unit 22 may the transmission powers $P_i^U$ and $P_j^D$ for all i and j are the same.

Figure 3:
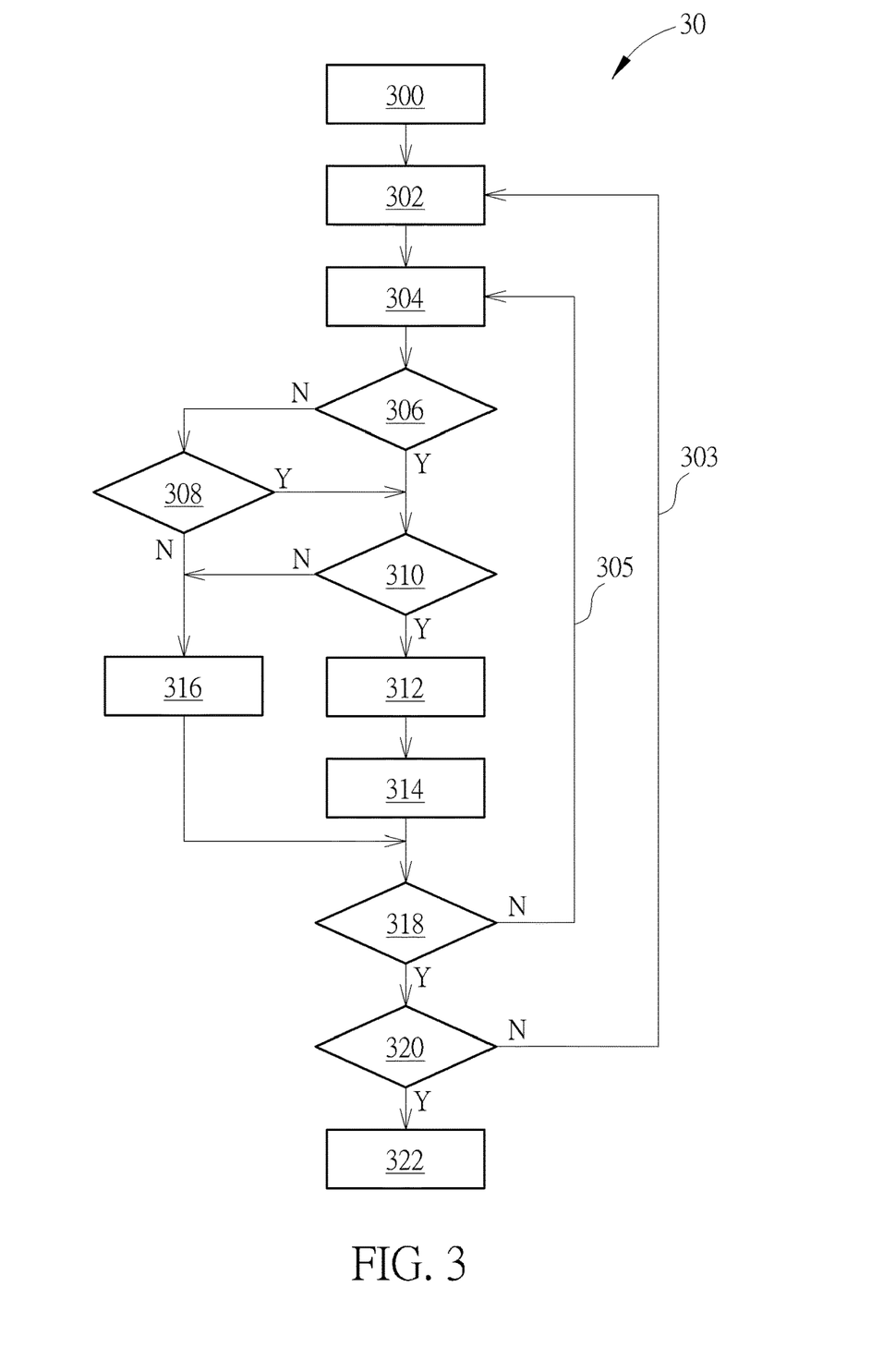
FIG. 3 is a schematic diagram of a method according to an embodiment of the present disclosure.

The user pairing operation in Table I may be iterated as a method 30, illustrated in FIG. 3 and executed by the processing unit 22. The method 30 comprises:

Step 300: Obtain the uplink set ULS and the downlink set DLS.

Step 302: Select the uplink user device $UE_{DL,i*}$ such that $$i^* = \underset{i \notin FUS, i \in US}{\mathrm{argmax}}\ H_{i \rightarrow B}^{U}$$

Step 304: Select the downlink user device $UE_{UL,j*}$ such that $$j^* = \underset{j \notin FDS, j \in DS}{\mathrm{argmax}}\ H_{B \rightarrow j}^{D}$$

Step 306: Determine whether $H_{i* \rightarrow B}^{U} > H_{j* \rightarrow B}^{U}$. If yes, go to Step 310; otherwise, go to Step 308.

Step 308: Determine whether $$H_{i* \rightarrow j*}^{} \leq \frac{P_{j*}^D H_{B \rightarrow j*}^D}{P_i^D \theta_{FD}}.$$

If yes, go to Step 310; otherwise, go to Step 316.

Step 310: Determine whether $SINR_{j|i} \geq SINR_{th}$. If yes, go to Step 312; otherwise, go to Step 316.

Step 312: Form the uplink user device $UE_{UL,i*}$ and the downlink user device $UE_{DL,j*}$ as a user pair ($UE_{UL,i*}$, $UE_{DL,j*}$), i.e., set $x_{i*,j*}=1$.

Step 314: Remove the uplink user device $UE_{UL,i*}$ from the uplink set ULS to update the uplink set ULS and remove the downlink user device $UE_{DL,j*}$ from the downlink set DLS to update the downlink set DLS.

Step 316: Remove the downlink user device $UE_{DL,j*}$ from the downlink set DLS to update the downlink set DLS.

Step 318: Check if $x_{i*,j*}=1$ or if there is no downlink device $UE_{DL,j}$ within the downlink set DLS can be paired with the uplink user device $UE_{DL,i*}$. If yes, go to Step 320; otherwise, go to Step 304.

Step 320: Check if every uplink user device $UE_{UL,i}$ has been considered as uplink candidate of the user pair. If yes, go to Step 322; otherwise, go to Step 302.

Step 322: Determine the uplink transmission powers $p_i^U$ for all i and the downlink transmission power $P_j^D$ for all j.

Step 302 is corresponding to Line 7 (of Table I). Step 304 is corresponding to Line 9. Steps 306 and 310 are corresponding to the condition on Line 10. Steps 306, 308 and 310 are corresponding to the condition on Line 15. Step 312 is corresponding to Line 12 and/or Line 16. Step 314 is corresponding to Lines 13-14 and/or Lines 17-18. Step 316 is corresponding to Line 20. Step 318 is corresponding to the condition on Line 22. Step 320 is corresponding to the condition on Line 24. Steps 304-318 and Path 305 are corresponding to the loop structure of Lines 8-22. In Path 303, the uplink set ULS and the downlink set DLS (or, equivalently, the uplink index set US and the downlink index set DS) are updated, which corresponds to Line 23, Steps 302-320 with Path 305 and Path 303 are corresponding to the loop structure of Lines 6-24. After the processing unit 22 steps into Step 322, the processing unit 22 obtains a plurality of user pairs In some embodiments, the channel gains above can be viewed as expected or estimated channel gains.

In summary, the present disclosure performs the user pairing operation to maximize the sum rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A user pairing method, applied in a wireless station, the method comprising:
   (a) the wireless station obtaining an uplink set and a downlink set;
   (b) the wireless station selecting a first uplink user device among the uplink set, wherein a first uplink channel gain corresponding to the first uplink user device is the strongest uplink channel gain among uplink channel gains corresponding to uplink user devices within the uplink set;
   (c) the wireless station selecting a first downlink user device among the downlink set, wherein a first downlink channel gain corresponding to the first downlink user device is the strongest downlink channel gain among downlink channel gains corresponding to downlink user devices within the downlink set;
   (d) the wireless station determining whether the first uplink channel gain corresponding to the first uplink user device is greater than a second uplink channel gain corresponding to the first downlink user device, to generate a first determination result;
   (e) the wireless station determining whether a first signal to noise plus interference ratio (SINR) perceived at the first downlink user device is greater than a first SINR threshold, to generate a second determination result; and
   (f) the wireless station forming the first uplink user device and the first downlink user device as a first user pair in a full duplexing (FD) mode when the first determination result and the second first determination result are positive, wherein the first user pair in the FD mode represents that an uplink transmission by the first uplink user device and a downlink transmission by the first downlink user device are performed within a time period and a frequency spectrum.

2. The method of claim 1, further comprising:
   (g) the wireless station determining whether a mutual channel gain between the first uplink user device and the first downlink device is less than or equal to a specific value, to generate a third determination result; and
   (h) the wireless station forming the first uplink user device and the first downlink user device as the first user pair in the FD mode, when the first determination result is negative, and when the second determination result and the third determination result are positive.

3. The method of claim 1, further comprising:
   the wireless station removing the first uplink user device from the uplink set to update the uplink set and the wireless station removing the first downlink user device from the downlink set to update the downlink set, when the first uplink user device and the first downlink user device are formed as the first user pair in the FD mode.

4. The method of claim 2, further comprising:
   the wireless station removing the first downlink user device from the downlink set to update the downlink set, when the first uplink user device and the first downlink user device are not formed as the first user pair in the FD mode.

5. The method of claim 4, further comprising:
   after the wireless station removing the first downlink user device from the downlink set, the wireless station performing the steps (c)-(h) until there is one downlink device within the downlink set which can be paired with the first uplink user device, or until there is no other downlink device within the downlink set which can be paired with the first uplink user device.

6. The method of claim 5, further comprising:
   the wireless station removing the first uplink user device from the uplink set to update the uplink set if there is no other downlink device within the downlink set which can be paired with the first uplink user device.

7. The method of claim 2, further comprising:
   the wireless station removing the first uplink user device from the uplink set to update the uplink set and the wireless station removing the first downlink user device from the downlink set to update the downlink set, when the first uplink user device and the first downlink user device are formed as the first user pair in the FD mode, or the wireless station removing the first downlink user device from the downlink set to update the downlink set, when the first uplink user device and the first downlink user device are not formed as the first user pair in the FD mode.

8. The method of claim 7, further comprising:
after the wireless station removing the first uplink user device from the uplink and the wireless station removing the first downlink user device from the downlink set, the wireless station performing the steps (b)-(h) based on the updated uplink set and the updated downlink set.

9. A wireless station, comprising:
a storage device, storing a program code; and
a processing unit, wherein the program code instructs the processing unit to perform the following steps:
(a) obtaining an uplink set and a downlink set;
(b) selecting a first uplink user device among the uplink set, wherein a first uplink channel gain corresponding to the first uplink user device is the strongest uplink channel gain among uplink channel gains corresponding to uplink user devices within the uplink set;
(c) selecting a first downlink user device among the downlink set, wherein a first downlink channel gain corresponding to the first downlink user device is the strongest downlink channel gain among downlink channel gains corresponding to downlink user devices within the downlink set;
(d) determining whether the first uplink channel gain corresponding to the first uplink user device is greater than a second uplink channel gain corresponding to the first downlink user device, to generate a first determination result;
(e) determining whether a first signal to noise plus interference ratio (SINR) perceived at the first downlink user device is greater than a first SINR threshold, to generate a second determination result; and
(f) forming the first uplink user device and the first downlink user device as a first user pair in a full duplexing (FD) mode when the first determination result and the second first determination result are positive, wherein the first user pair in the FD mode represents that an uplink transmission by the first uplink user device and a downlink transmission by the first downlink user device are performed within a time period and a frequency spectrum.

10. The wireless station of claim 9, wherein the program code further instructs the processing unit to perform the following steps:
(g) determining whether a mutual channel gain between the first uplink user device and the first downlink device is less than or equal to a specific value, to generate a third determination result; and
(h) forming the first uplink user device and the first downlink user device as the first user pair in the FD mode, when the first determination result is negative, and when the second determination result and the third determination result are positive.

11. The wireless station of claim 9, wherein the program code further instructs the processing unit to perform the following steps:
removing the first uplink user device from the uplink set to update the uplink set and removing the first downlink user device from the downlink set to update the downlink set, when the first uplink user device and the first downlink user device are formed as the first user pair in the FD mode.

12. The wireless station of claim 10, wherein the program code further instructs the processing unit to perform the following step:

removing the first downlink user device from the downlink set to update the downlink set, when the first uplink user device and the first downlink user device are not formed as the first user pair in the FD mode.

13. The wireless station of claim 12, wherein the program code further instructs the processing unit to perform the following steps:
after removing the first downlink user device from the downlink set, performing the steps (c)-(h) until there is one downlink device within the downlink set which can be paired with the first uplink user device, or until there is no other downlink device within the downlink set which can be paired with the first uplink user device.

14. The wireless station of claim 13, wherein the program code further instructs the processing unit to perform the following steps:
removing the first uplink user device from the uplink set to update the uplink set if there is no other downlink device within the downlink set which can be paired with the first uplink user device.

15. The wireless station of claim 10, wherein the program code further instructs the processing unit to perform the following steps:
removing the first uplink user device from the uplink set to update the uplink set and removing the first downlink user device from the downlink set to update the downlink set, when the first uplink user device and the first downlink user device are formed as the first user pair in the FD mode, or removing the first downlink user device from the downlink set to update the downlink set, when the first uplink user device and the first downlink user device are not formed as the first user pair in the FD mode.

16. The method of claim 15, wherein the program code further instructs the processing unit to perform the following steps:
after removing the first uplink user device from the uplink and removing the first downlink user device from the downlink set, performing the steps (b)-(h) based on the updated uplink set and the updated downlink set.

17. A wireless system, comprising:
a plurality of uplink user devices and a plurality of downlink user devices; and
a wireless station, comprising:
a storage device, storing a program code; and
a processing unit, wherein the program code instructs the processing unit to perform the following steps:
(a) obtaining an uplink set and a downlink set;
(b) selecting a first uplink user device among the uplink set, wherein a first uplink channel gain corresponding to the first uplink user device is the strongest uplink channel gain among uplink channel gains corresponding to the uplink user devices within the uplink set;
(c) selecting a first downlink user device among the downlink set, wherein a first downlink channel gain corresponding to the first downlink user device is the strongest downlink channel gain among downlink channel gains corresponding to downlink user devices within the downlink set;
(d) determining whether the first uplink channel gain corresponding to the first uplink user device is greater than a second uplink channel gain corresponding to the first downlink user device, to generate a first determination result;
(e) determining whether a first signal to noise plus interference ratio (SINR) perceived at the first downlink user device is greater than a first SINR threshold, to generate a second determination result; and (f) forming the first uplink user device and the first downlink user device as a first user pair in a full duplexing (FD) mode when the first determination result and the second first determination result are positive, wherein the first user pair in the FD mode represents that an uplink transmission by the first uplink user device and a downlink transmission by the first downlink user device are performed within a time period and a frequency spectrum.

18. The wireless system of claim 17, wherein the program code further instructs the processing unit to perform the following steps:

(g) determining whether a mutual channel gain between the first uplink user device and the first downlink device is less than or equal to a specific value, to generate a third determination result; and (h) forming the first uplink user device and the first downlink user device as the first user pair in the FD mode, when the first determination result is negative and the second determination result and the third determination result are positive.

19. The wireless system of claim 17, wherein the program code further instructs the processing unit to perform the following step:

removing the first uplink user device from the uplink set to update the uplink set and removing the first downlink user device from the downlink set to update the downlink set, when the first uplink user device and the first downlink user device are formed as the user pair in the FD mode.

20. The wireless system of claim 17, wherein the program code further instructs the processing unit to perform the following step:

removing the first downlink user device from the downlink set to update the downlink set, when the first uplink user device and the first downlink user device are not formed as the user pair in the FD mode.

* * * * *